United States Patent
Kadambi et al.

(10) Patent No.: US 6,195,334 B1
(45) Date of Patent: Feb. 27, 2001

(54) APPARATUS AND METHOD FOR TERMINATING A DATA TRANSFER IN A NETWORK SWITCH IN RESPONSE TO A DETECTED COLLISION

(75) Inventors: Jayant Kadambi, Milpitas; Mohan V. Kalkunte, Sunnyvale, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/992,842

(22) Filed: Dec. 18, 1997

(51) Int. Cl.[7] .......................... G08C 15/00; H04L 12/413
(52) U.S. Cl. ............................... 370/236; 370/447
(58) Field of Search ................... 370/445–448, 370/461, 462, 463, 407, 425, 232, 233, 389, 392, 400, 390

(56) References Cited

U.S. PATENT DOCUMENTS

| | | | |
|---|---|---|---|
| 5,568,476 | * 10/1996 | Sherer et al. | 370/60 |
| 5,604,869 | * 2/1997 | Mincher et al. | 395/200.2 |
| 5,651,002 | * 7/1997 | Van Seters et al. | 370/392 |

* cited by examiner

*Primary Examiner*—Huy D. Vu
*Assistant Examiner*—Toan Nguyen

(57) ABSTRACT

A network switch in a packet switched network has multiple network ports, each having a physical layer transceiver, a media access controller, transmit and receive buffers, and a bus interface for transferring data using a host processor. The network switch includes a low-latency mode, where a transfer request is initiated by a network switch port when the receive buffer includes 16 bytes of packet data. If during transfer the MAC detects a collision on the shared network medium, the network port generates a HALT signal in response to detecting a collision, enabling the host controller transferring data from the network port to abort the transfer, and begin transfer on another port. Status information also is stored in the receive buffer in response to the detected collision. Generation of the HALT signal enables the network switch to operate in low-latency mode without requiring substantial resources by the host processor to filter collision fragments or runt packets.

12 Claims, 3 Drawing Sheets

APPARATUS AND METHOD FOR TERMINATING A DATA TRANSFER IN A NETWORK SWITCH IN RESPONSE TO A DETECTED COLLISION

BACKGROUND OF THE INVENTION

1. Technical Field

The present field relates to network switching and more particularly, to methods in controlling internal data transfers in a network switch for a half-duplex Ethernet (IEEE 802.3) packet switched network.

2. Background Art

Switched local area networks use a network switch for supplying data frames between network nodes such as network stations, routers, etc., where each network node is connected to the network switch by a media. The switched local area network architecture uses a media access control (MAC) layer enabling a network interface to access the media. The network switch passes data frames received from a transmitting node to a destination node based on the header information in the received data frame.

Proposals have been made to implement a network switch compliant with IEEE 802.3 by integrating a plurality of MAC devices and physical layer transceivers on a single chip. For example, a single integrated circuit may be configured to include a plurality of media access controllers having respective physical layer transceivers for communication with a network media. The integrated circuit also includes a plurality of transmit and receive buffers for temporarily storing the data for the respective MACs, and a plurality of bus interfaces configured for transferring data packets to and from the respective buffers onto a common bus. Such devices referred to as "Quad-MACs," enable switch designers to implement a network switch by connecting the Quad-MACs to a shared bus serving the network switch fabric.

Such Quad-MAC devices are typically configured to request a DMA transfer on the shared bus when the number of bytes stored in the receive buffer equals the minimum packet size of at least 64 bytes. However, setting the threshold at 64 bytes before data transfer on the shared bus increases the latency of the data packet in the switch. The latency of the data packet is the time delay between the time the data packet is first received by an input network switch port and the time the data is output by an output switch port. Hence, latency increases when data transfer is deferred until at least 64 bytes of a data frame are received before data transfer is initiated.

Although the threshold of the receive buffer (referred to as the receive FIFO watermark) can be reduced to a value less than the minimum data packet length, the switch fabric may end up receiving a collision fragment or a runt packet, at which point the switch fabric needs to filter collision fragments and runt packets from valid data packets. A collision fragment could occur if the network port is connected to a shared medium connecting two network nodes, where the two network nodes simultaneously transmit a data packet on the shared medium.

Hence, reducing the latency by lowering the receive FIFO watermark level which triggers a DMA transfer request places a burden on the host processor to filter collision and runt packets. Hence, the host processor is forced to expend substantial resources analyzing each received stream of packet data to determine whether the received packet data is a valid data packet, or whether the received packet data is either a collision fragment or a runt packet.

SUMMARY OF THE INVENTION

There is a need for an arrangement in a network switch for reducing the latency of switched data packets while minimizing processing requirements by a host processor in filtering collision fragments and runt packets.

There is also a need for an arrangement in a network switch that enables a host system to efficiently filter collision fragments or invalid data packets.

These and other needs are attained by the present invention, where a network port requests a transfer based on a stored number of bytes reaching a prescribed threshold less than a minimum data packet length, and where a halt transfer signal is asserted by the network port in response to a detected collision to cause the network switch to halt transfer of the stored data in the receive buffer.

According to one aspect of the present invention, a method in a network switch having a plurality of network ports comprises receiving, by one of the network ports, header data of a data packet having at least address information. Each network port includes a media access controller (MAC) for receiving packet data from a corresponding physical layer interface coupled to network media and a receive buffer for storing packet data received by the MAC. The method further comprises storing the header data in the corresponding receive buffer, initiating transfer by the network switch of the stored data in the receive buffer of the one network port in response to a number of bytes of the stored header data reaching a prescribed threshold less than a minimum data packet length. detecting a collision on the media following the initiated transfer and during reception of packet data for the data packet following the header data, and asserting a halt transfer signal by the one network port in response to the detected collision to cause the network switch to halt transfer of the stored data in the receive buffer. Initiating transfer in response to the number of bytes reaching a prescribed threshold less than the minimum data packet length minimizes packet latency within the network switch. Moreover, generation of the halt transfer signal by the network port in response to the detected collision ensures that the transfer of invalid data throughout the switch is minimized. Hence, low latency is achieved without requiring substantial resources by the host processor to filter collision fragments. In addition, the network switch may begin transfer on another network port to minimize the lost throughput due to the initial transfer of the collision fragments.

Another aspect of the present invention provides a network switch comprising a plurality of network ports, each including a media access controller for receiving packet data from the corresponding physical layer transceiver, a receive buffer for storing the packet data received by the media access controller, and a bus interface for outputting the stored packet data from the corresponding receive buffer, the bus interface configured for outputting a transfer request in response to the stored packet data reaching a prescribed threshold less than a minimum packet length and a halt transfer signal in response to a collision detected by the corresponding media access controller during reception of the corresponding packet data, switching logic for outputting a data packet received by a first of the network ports to at least a second of the network ports based on corresponding address information in the data packet, a bus for transporting the received packet data between the network ports and the switching logic, and a bus controller configured for initiating a data transfer from one of the network ports in response to the corresponding transfer request, the bus controller halting the data transfer and initiating another data transfer with another one of the network ports in response to the halt transfer signal by the one network port. Generation of the transfer request based on a prescribed threshold less than the minimum packet length enables the network switch to maintain a low latency for switching data packets. Moreover, detection of the halt transfer signal by the bus controller enables the bus controller to immediately identify collision fragments, as well as initiate transfer on another network port requesting service to optimize throughput for valid data packets on the bus.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
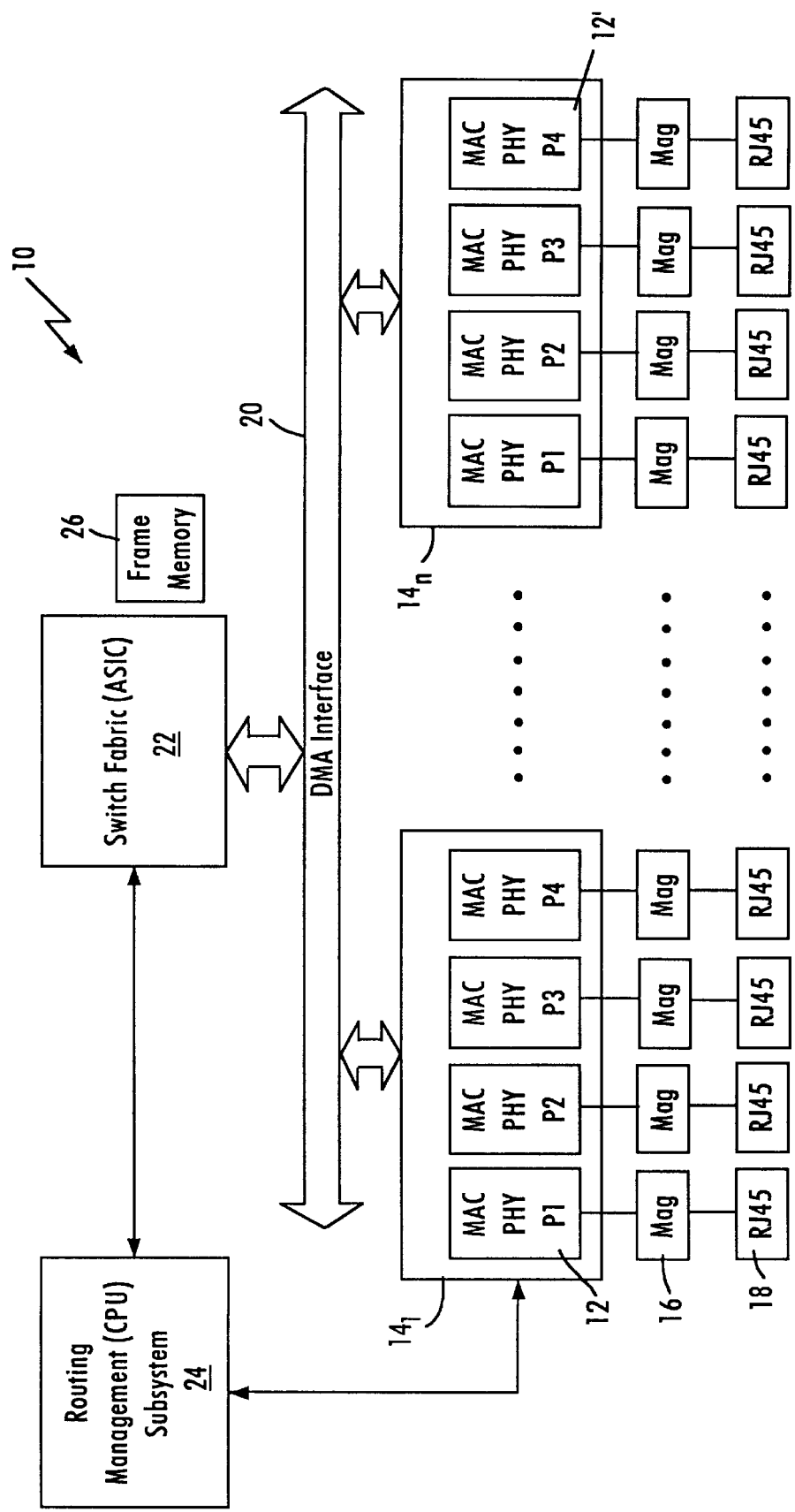
FIG. 1 is a block diagram of a network switch having a plurality of network ports for switching data packets according to an embodiment of the present invention.

FIG. 1 is a block diagram illustrating a network switch 10 configured for switching received packet data between network ports according to an embodiment of the present invention. As shown in FIG. 1, the switch 10 includes a plurality of network ports 12 integrated on a single chip 14. Each network port 12 is configured for transmitting data signals representing packet data to a magnetic transformer 16 that performs signal conditioning on transmitted signals received by a connector 18 from a remote network node, such as a workstation.

The network switch 10 also includes a data bus 20, switching logic 22, a host computer system 24 having a routing managing subsystem for routine received data packets, and a frame memory 26 for storing, received data frames. According to the disclosed embodiment, the routing management subsystem 24 operates as a DMA controller for transferring packet data from a source network port 12 to memory 26, and from memory 26 to a destination network port 12' based on address information in the received packet data, and switching logic 22. As recognized in the art, the packet data is transferred from the network port 12 to the frame memory 26 for storage, while the switch fabric 22 switches previously-received data packets by outputting a received data packet to an output network port 12' based on the corresponding address information.

Figure 2:
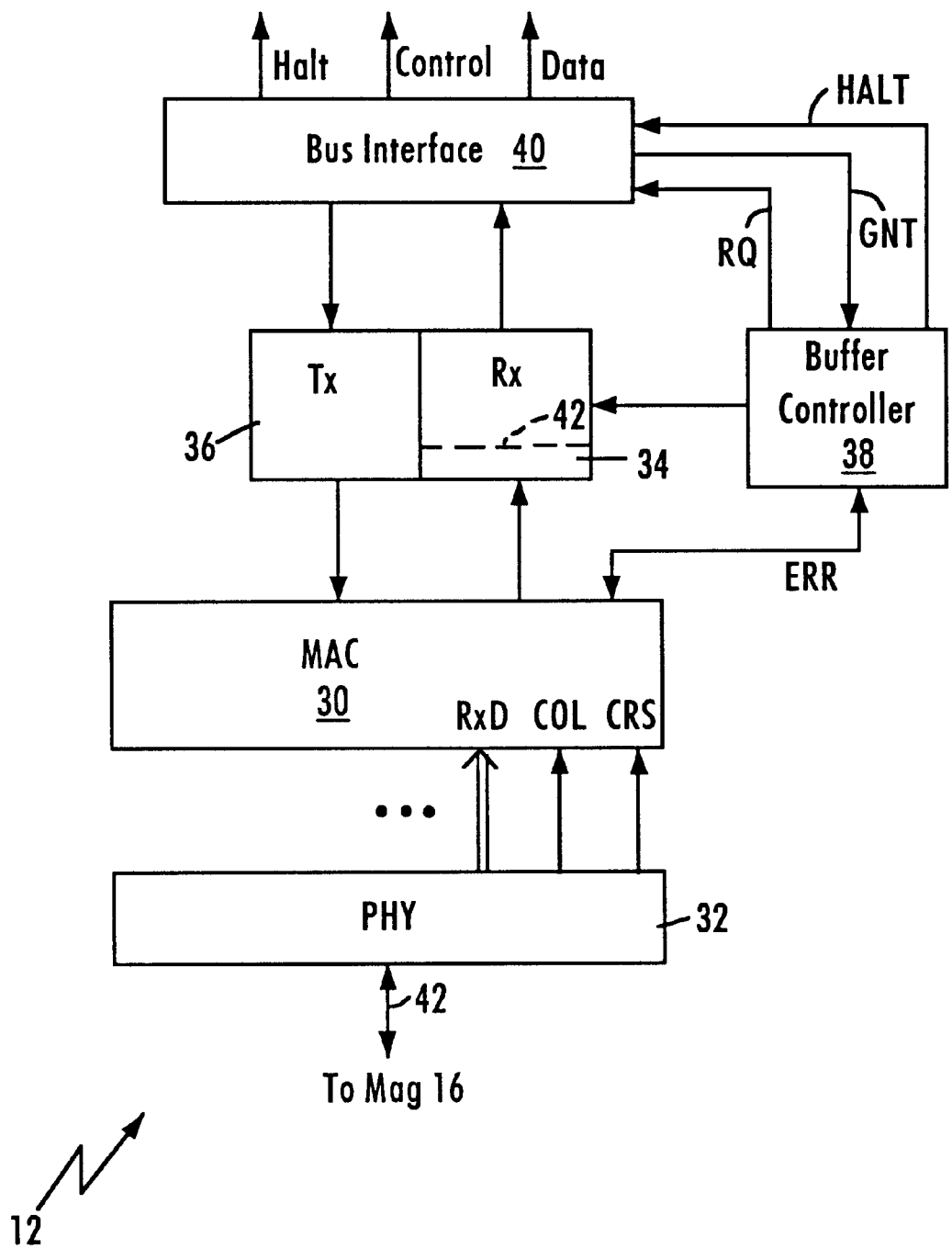
FIG. 2 is a block diagram illustrating in detail one of the network ports of FIG. 1.

FIG. 2 is a block diagram illustrating in detail one of the network ports 12 of FIG. 1 according to an embodiment of the present invention. As shown in FIG. 2, the network port 12 includes a media access controller (MAC) 30, a physical layer (PHY) transceiver 32, a receive buffer 34, a transmit buffer 36, a buffer controller 38, and a bus interface 40. The physical layer transceiver 32 is configured for sending and receiving a serial data stream of packet data onto a network media 42. The physical layer transceiver 32 receives from the network media 42 an analog signal carrying serial data. The PHY 32 reconditions the analog signal, and recovers the serial data stream and the network clock. The serial data stream recovered by the physical layer transceiver 32 is supplied as packet data to the MAC 30. The physical layer transceiver 32 also detects network conditions, for example carrier sense (CRS) indicating detection of a receive carrier, and collision (COL) indicating a collision encountered between two contending network nodes on the shared medium 42.

The MAC 30 is configured for sending and receiving data packets according to Ethernet (ANSI/IEEE 802.3) protocol. The communication of transmit data (not shown) and receive data between the MAC 30 and the physical layer transceiver 32 may be transferred, for example, according to different well-recognized protocols.

The MAC 30 is configured for detecting a data packet based on detection of a 56-bit preamble, followed by an 8-bit start frame delimiter (SFD). The IEEE 802.3 frame then includes a 6-byte destination address, a 6-byte source address, a length field of two bytes, followed by a data field ranging from 46 to 1500 bytes. As recognized in the art, the minimum data packet size is 64 bytes.

The MAC 30, upon detecting a data packet from the physical layer transceiver 32, stores the received packet data in a receive buffer 34. A packet that arrives from a remote workstation is buffered in the receive buffer 34, and a receive DMA transfer request (RQ) is output be the buffer controller 38 when the stored number of data bytes in the receive buffer 34 reaches a prescribed receive FIFO watermark (RX_FW), shown as dotted line 42 in FIG. 2.

Typically, the RX_FW is set at 64 bytes so that a collision fragment or a runt packet is not transferred to the switching fabric 22 of FIG. 1. However, as described above, the latency of the packet is slightly higher because of buffering of at least 64 bytes before initiating data transfer.

According to the disclosed embodiment, the receive FIFO watermark level 42 is set at 16 bytes, enabling the buffer controller 38 to output a DMA transfer request (RQ) to the bus interface 40 after only 16 bytes have been received. Setting the RX_FW 42 at 16 bytes enables a "cut-through" forwarding of the received packet, although this arrangement would normally place a burden on the host processor 24 to filter collision and runt packets stored in the frame memory 26 from the network port 12. This arrangement would normally result in additional processing requirements for the host processor 24, as well as waste memory space in the frame memory 26.

According to the disclosed embodiment, the buffer controller 38 receives an error signal from the MAC 30 to indicate that a current packet being received has an error, for example due to a detected collision condition or due to the received data packet being a runt packet (i.e., less than the minimum frame size). In response to the error signal (ERR), the buffer controller 38 stores status information in the receive buffer related to the received packet data, enabling the host processor 24 to identify the status of the received data frame based on the status frame. Hence, the host 24 can easily determine the validity of received packet data based on the status, as opposed to interpreting the actual packet data to determine whether the data is a valid data frame.

In addition, the buffer controller 38 monitors the transfer of data from the receive buffer 34 by the controller 24. If the buffer controller 38 detects that a data transfer is initiated during detection of a collision by the MAC 30, the buffer controller 38 outputs a halt signal (HALT) to the bus interface 40. The bus interface 40 in response generates a halt transfer signal in response to the collision detected by the corresponding MAC 30. The host system 24 will immediately stop transfer of data, and will thus be available to process the next request.

Figure 3:
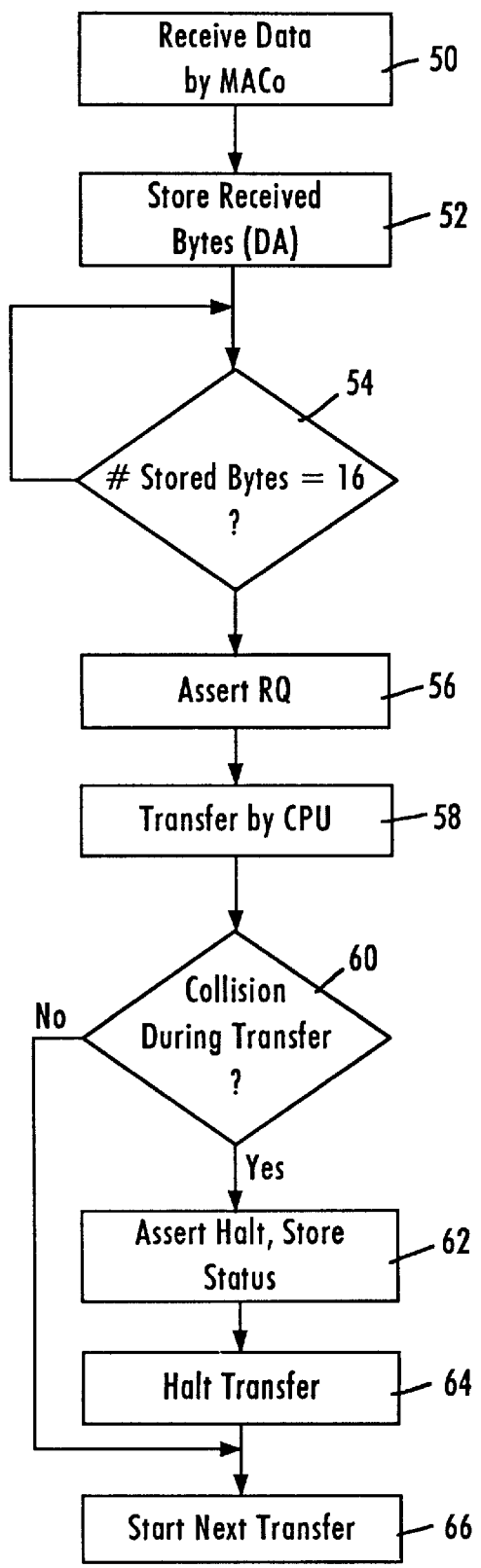
FIG. 3 is a flow diagram illustrating the method for switching packet data through the network switch of FIG. 1 according to an embodiment of the present invention.

FIG. 3 is a block diagram illustrating, a method for transferring data according to an embodiment of the present invention. As shown in FIG. 3, the method begins in step 50 by the MAC 30, for example the MAC 30 of port 0, receiving packet data from the corresponding physical layer transceiver 32. The MAC 30 stores the received data bytes including at least the destination address (DA) field in the receive buffer 34 in step 52. If in step 54 the buffer controller 38 determines that the stored number of data bytes for the received packet data equals the minimum RX_FW 42 of 16 bytes, the buffer controller 38 asserts the transfer request (RQ) in step 56. Upon detecting the request (RQ), the routing management subsystem 24 in the host processor will initiate transfer of the stored data in the receive buffer 34 based on an internal scheduling mechanism. For example, the routing management subsystem 24 may follow a round-robin scheme, where network ports asserting the respective transfer request signals are services according to a predetermined sequence. In such an arrangement, the host 24 will skip a port 12 that does not assert the transfer request signal.

After the transfer has begun by the host computer system 24, for example as a DMA transfer to the frame memory 26, the buffer controller 38 monitors to determine whether an error signal is received from the MAC 30 indicating a collision during transfer in step 60. If no collision is detected during the transfer, then the DMA transfer of stored data bytes in the receive buffer 34 is continued until the entire data packet has been received by the buffer 34 and transferred by the host 24 to the frame memory 26. The host 24 will then be able to start the next transfer in step 62.

If in step 60 the buffer controller 38 detects an error signal during the transfer of data from the receive buffer 34, the buffer controller 38 asserts a halt transfer signal (HALT), which is asserted by the bus interface 40 on the DMA interface bus 20. The host 24, upon detecting the HALT signal on the bus 20, immediately halts transfer in step 64 of the data from the network port 12 to the frame memory 26, and begins servicing another network port 12 having requested a data transfer in step 66.

According to the disclosed embodiment, a network port operating in low-latency mode generates a HALT signal in response to detecting a collision. enabling a host controller transferring data from the network port to abort the transfer. Hence, the host system is able to free bus bandwidth to process other requests from other network ports. The HALT signal is deasserted when the receive activity (CRS) is completed, and after the receive frame status is stored in the receive buffer 34 by the buffer controller 38.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network switch having a plurality of network ports, the method comprising:

receiving by one of the network ports header data of a data packet having at least address information, each network port including a media access controller (MAC) for receiving packet data from a corresponding physical layer interface coupled to network media and a receive buffer for storing packet data received by the MAC;

storing the header data in the corresponding receive buffer;

initiating transfer by the network switch of the stored data in the receive buffer of the one network port in response to a number of bytes of the stored header data reaching a prescribed threshold less than a minimum data packet length;

detecting a collision on the media following the initiated transfer and during reception of packet data for the data packet following the header data; and asserting a halt transfer signal by the one network port in response to the detected collision to cause the network switch to halt transfer of the stored data in the receive buffer, wherein the asserting step comprises:
asserting the halt transfer signal on a bus supplying the transferred data from the receive buffer; and
storing a status condition in the receive buffer indicating an invalidity condition of the corresponding stored header data.

2. The method of claim 1, wherein the initiating transfer step comprises:

determining whether the number of bytes of the stored header data reaches the prescribed threshold;

asserting a transfer request signal by the one network port on a switch bus interface in response to the determined number of bytes reaching the prescribed threshold; and transferring the stored data from the receive buffer via the switch bus interface by a bus controller in response to the asserted transfer request.

3. The method of claim 1, further comprising selecting the prescribed threshold from a plurality of predetermined thresholds.

4. The method of claim 3, wherein the prescribed threshold is substantially equal to 16 bytes.

5. The method of claim 1, further comprising:

halting the transfer by the network switch of the stored data in response to the halt transfer; and initiating transfer by the network switch of data from another network port upon completion of the halting step.

6. A method in a network switch having a plurality of network ports, the method comprising:

receiving from a network node at least an address portion of a data packet by one of the network ports, each network port having a media access controller and a receive buffer for storing the data packet portion;

initiating a transfer by a bus controller in the network switch for removing the stored data packet portion from the receive buffer corresponding to the one network port, in response to the stored data packet portion reaching a prescribed threshold less than a minimum data packet length;

detecting a collision during reception of the data packet by the one network port and during the transfer by the bus controller; and halting the transfer by the bus controller in response to the detected collision, wherein the halting step comprises:
outputting a halt signal in response to the detected collision, comprising outputting the halt signal from the one network port onto a bus configured for transporting the stored data packet portion accessed by the bus controller; and responding to the halt signal in the bus controller by halting the transfer, and initiating a transfer from another one of the network ports.

7. The method of claim 6, wherein the outputting step comprises outputting an interrupt signal on the bus.

8. The method of claim 6, wherein the halt signal outputting step comprises asserting the halt signal until detecting a termination of receive activity by the one network port.

9. A method in a network switch having a plurality of network ports, the method comprising:

receiving from a network node at least an address portion of a data packet by one of the network ports, each network port having a media access controller and a receive buffer for storing the data packet portion;

initiating a transfer by a bus controller in the network switch for removing the stored data packet portion from the receive buffer corresponding to the one network port, in response to the stored data packet portion reaching a prescribed threshold less than a minimum data packet length;

detecting a collision during reception of the data packet by the one network port and during the transfer by the bus controller; and halting the transfer by the bus controller in response to the detected collision, wherein the halting step further comprises storing a status message in the receive buffer corresponding to the one network port in response to the detected collision.

10. A network switch comprising:

a plurality of network ports, each including a media access controller for receiving packet data from the corresponding physical layer transceiver, a receive buffer for storing the packet data received by the media access controller, and a bus interface for outputting the stored packet data from the corresponding receive buffer, the bus interface configured for outputting a transfer request in response to the stored packet data reaching a prescribed threshold less than a minimum packet length and a halt transfer signal in response to a collision detected by the corresponding media access controller during reception of the corresponding packet data;

switching logic for outputting a data packet received by a first of the network ports to at least a second of the network ports based on corresponding address information in the data packet;

a bus for transporting the received packet data between the network ports and the switching logic;

a bus controller configured for initiating a data transfer from one of the network ports in response to the corresponding transfer request, the bus controller halting the data transfer and initiating another data transfer with another one of the network ports in response to the halt transfer signal by the one network port; and wherein the media access controller for the one network port is configured to store status information in the corresponding receive buffer in response to the detected collision.

11. The network switch of claim 10, wherein each network port further comprises a physical layer transceiver for receiving data from a network medium for the corresponding media access controller.

12. The network switch of claim 10, wherein the switching logic includes a filter for selectively discarding the transferred packet data based on the corresponding status information.

* * * * *